3,368,924
BATTERY WITH ZINC ANODE COATED
WITH ALKALI METAL GETTER
Asaf A. Benderly, Potomac, Md., and Allan M. Biggar, Arlington County, Va., assignors to the United States of America as represented by the Secretary of the Army
Filed Jan. 28, 1966, Ser. No. 523,806
3 Claims. (Cl. 136—102)

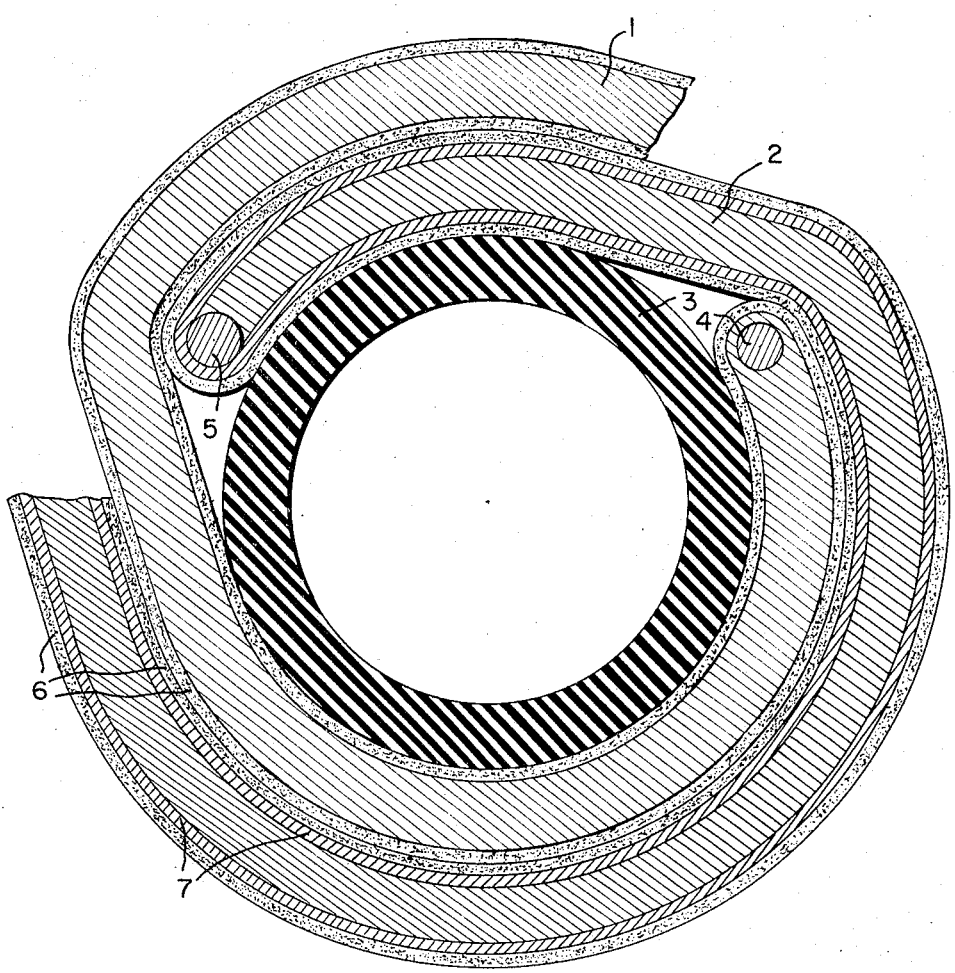

This invention relates to electric batteries, and more particularly, to reserve-type batteries having stabilized zinc anodes.

As is well known, the basic unit of an electric battery is a cell consisting of an anode, a cathode and an electrolyte. Primary or secondary cells having a zinc anode are capable of high discharge currents in an alkaline electrolyte. Zinc anodes are most commonly utilized in conjunction with manganese dioxide, nickel oxide, an oxide of silver, lead oxide, copper oxide or other metal oxides as the cathode.

Reserve batteries are batteries maintained in a non-reactive state, usually in a dry-charged condition, until required for use. The electrodes are usually stronger in the metallic or charged condition and are much less affected by vibration and shock encountered in storage and handling. Dry-charged batteries maintain their charge for long periods of time under adverse conditions of temperature and are easier to bring to operating conditions than similar uncharged batteries.

Batteries having high energy requirements, particularly those intended for field use, are made of highly reactive materials. An active electrode material such as zinc can react with traces of oxygen and/or moisture that may be present to form oxides, hydroxides and possibly other compounds of zinc. Such reactions on the surface of the zinc electrode result in a reduced activity of the electrode. This reduction in activity may take the form of extending the time required for making the battery operational and in extreme cases to completely passivating the electrode.

We have discovered that coating a zinc electrode with an alkali metal such as sodium protects the surface of the zinc from oxidation and hydroxylation in the presence of air and moisture.

It is, therefore, an object of the present invention to provide a battery wherein the zinc anode exhibits improved storage stability in the dry-charged state.

It is a further object of the invention to provide a dry-charged battery that can be quickly made operational even at lower temperatures.

These and other objects and advantages of the present invention will become apparent on consideration of the improved zinc anode more fully described in the following discussion and accompanying drawing which is a sectional view through a zinc-silver oxide battery assembly.

Broadly speaking, the present invention is a battery having a zinc anode and in the dry-charged charged condition wherein the zinc anode is coated with an alkali metal.

It is important to note that the alkali metal coating of the present invention is intended for reserve-type batteries wherein the electrolyte is kept separate from the zinc anode until the battery is to be used. It is during this dry-charged storage period that the alkali metal protects the zinc electrode until it is made operational by the addition of the electrolyte.

The alkali metal coating acts as a getter for any water vapor and/or oxygen present by absorbing and reacting with these materials thereby preserving the activity of the zinc anode. The alkali metal acts sacrificially and prevents any oxygen or moisture leaking into the battery assembly from reacting with the zinc anode.

Alkali metals are particularly suitable as getters because they are more reactive to oxygen and moisture than zinc and because their reaction products are less objectionable than those of zinc with oxygen or moisture. The resultant alkali metal hydroxide and/or oxide and the unreacted alkali metal are readily soluble in the alkaline electrolyte, usually aqueous potassium hydroxide, even at very low temperatures.

The alkali metal may be coated onto the zinc electrode in any known manner. For example, the alkali metal may be vacuum deposited or a dispersion of the finely divided metal, e.g., sodium, in an organic vehicle such as xylene or white oil may be applied to the electrode and the vehicle evaporated prior to assembly of the battery. The particular coating method employed and the thickness of the alkali metal coating are not critical save that sufficient metal by employed to react with any oxygen and/or moisture present or that may be expected to leak into or enter the system during its maximum storage period. Preferably, the alkali metal is employed in further excess, and the unreacted metal is dissolved on activating the battery by the addition of electrolyte.

Primary or secondary alkaline zinc-silver oxide cells are important in the preparation of batteries for military use. The electrodes are separated by means of semipermeable separators generally made of cellophane or other form of cellulose. The cells are assembled in rectangular, cylindrical, and disc-shaped forms depending on their ultimate use. Such batteries may be intended for use as reserve-type batteries and often contain a highly active zinc anode in the dry-charged state during storage. The storage stability of such batteries is greatly improved by coating the zinc anode with an alkali metal such as sodium as evidenced by the rapidity with which the improved batteries can be made operational on the addition of electrolyte.

Our invention is further illustrated by the following non-limiting description of a specific embodiment of the present invention: Referring to the drawing, a zinc-silver oxide battery assembly is made up of a silver oxide cathode 1 having a lead 4 and a zinc anode 2 having a lead 5 wound about each other and a central hollow insulating core 3. These electrodes are separated by means of semipermeable spacers 6. The zinc electrode is coated on both sides with the thin layer of sodium metal 7. The addition of electrolyte dissolves the sodium and any sodium hydroxide and/or oxide present and makes the battery assembly operational.

It is evident that various changes and modifications may be made without departing from the spirit and the scope of the present invention. The invention is as described in the appended claims:

We claim:
1. A battery having a zinc anode and in the dry-charged condition wherein the zinc anode is coated with a fugitive alkali metal which is capable of dissolving in the electrolyte during the use of said battery.
2. A battery according to claim 1 wherein the metal is sodium.
3. A dry-charged zinc-silver oxide battery comprising a silver oxide cathode and a zinc anode having a fugitive coating of sodium which is capable of dissolving in the electrolyte during the use of said battery.

References Cited

UNITED STATES PATENTS

| | | |
|---|---|---|
| 2,536,697 | 1/1951 | Ruben. |
| 2,631,180 | 3/1953 | Robinson _____ 136—83 |
| 3,042,732 | 7/1962 | Kordesch. |
| 3,075,032 | 1/1963 | Andre. |

ALLEN B. CURTIS, *Primary Examiner.*

C. F. LE FEVOUR, *Assistant Examiner.*